United States Patent Office 3,553,131
Patented Jan. 5, 1971

3,553,131
LUBRICANT CONTAINING AN AMINE-
PHOSPHONATE COMBINED ADDITIVE
Herbert L. Hepplewhite, Woodbury Heights, N.J., and
Henry E. Bieber, deceased, late of Mickleton, N.J., by
Dianne Bieber, executrix, Fleetwood, Pa., assignors to
Mobil Oil Corporation, a corporation of New York
No Drawing. Continuation-in-part of application Ser. No.
632,899, Apr. 24, 1967. This application Sept. 26, 1969,
Ser. No. 861,507
Int. Cl. C10m $1/46, 1/48$
U.S. Cl. 252—46.7     15 Claims

ABSTRACT OF THE DISCLOSURE

Novel compositions of synthetic ester lubricants containing in admixture an organic phosphonate and an organic amine having improved storage stability and load-carrying properties.

CROSS REFERENCE TO RELATED APPLICATIONS

This application is a continuation-in-part of application Ser. No. 632,899, filed Apr. 24, 1967, now abandoned.

BACKGROUND OF THE INVENTION

This invention relates to lubricants for aircraft engines, and in particular it relates to a novel combination of organic phosphonates and organic amines as additives for lubricants to improve the load-carrying properties thereof.

DESCRIPTION OF THE PRIOR ART

U.S. Pat. No. 3,115,465, describes the use of a synergistic antioxidant mixture for use in lubricants, the mixture being composed of methylenebis phenol and a phosphite ester, e.g., diphenyl phosphite. The reference teaches that in addition to the synergistic mixture, use may be made of other additives such as diphenylamine, phenylnaphthylamine or long chain alkylamines.

British Pat. No. 899,101, is directed toward the use of aminophosphonates as load-carrying agents for diester lubricants. This patent teaches that an amine may additionally be present in the lubricant to solubilize the aminophosphonate. Further, dibutyl hydrogen phosphate (also known as dibutyl hydrogen phosphonate) is included in the disclosure of the British patent, but merely to show its inferiority to the inventive additive.

U.S. Pat. No. 3,321,401, discloses a synergistic, load-carrying mixture which imparts load-carrying properties to lubricants of the type disclosed in the present application. The mixture is made up of (1) a phosphoramidate or a phosphate and (2) a hydrogen phosphite. The patent also discloses that an amine may be used in certain instances to solubilize phosphoramidates of low solubility in the particular lubricant medium being used.

While each of the patents referred to mentions hydrogen phosphites and amines, not one discloses or suggests an amine-hydrogen phosphite combination.

Also, U.S. Pat. No. 3,115,466, teaches the use of a synergistic antioxidant compound of a mixture of (1) a phosphonate and (2) an amine of the formula:

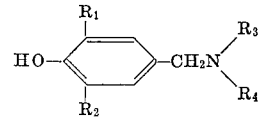

in diester oils.

DESCRIPTION OF THE INVENTION

We have now discovered that certain ester lubricant compositions are provided with load-carrying properties by incorporating therein a minor proportion of a pre-heated or separately combined mixture of (1) a diorganophosphonate having the formula:

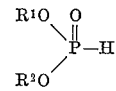

wherein $R^1$ and $R^2$ may be the same or different and are individually selected from the group consisting of aryl, and alkyl-substituted aryl, each of $R^1$ and $R^2$ having from 6 to about 40 carbon atoms, preferably from about 6 to about 25 carbon atoms, and more preferably from 6 to about 16 carbon atoms, and (2) an organic amine having the formula:

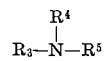

wherein $R^3$, $R^4$, and $R^5$ may be the same or different and are selected from the group consisting of hydrogen, alkyl, cycloalkyl, aryl, and alkyl-substituted aryl, each of the organic groups having from 1 to about 30 carbon atoms, preferably from about 4 to about 25 carbon atoms, and they may also contain atoms of oxygen, sulfur, nitrogen, and halogen (e.g., chlorine, bromine, fluorine, iodine) attached thereto. It will be understood that no more than two of $R^3$, $R^4$, and $R^5$ can be hydrogen.

The novel products or mixtures of this invention, when incorporated in the ester lubricant compositions to the extent of from about 0.01% to about 10% by weight, preferably from about 0.1% to about 5%, provide higher load-carrying properties than hitherto obtainable by similar additives. The compositions containing these products or mixtures are surprisingly stable under accelerated storage conditions, they do not undergo change of state in storage, and they are relatively non-corrosive to metals ordinarily susceptible to corrosion by uninhibited oxidized compositions.

The phosphonates used in this invention may be produced by any known means. One preferred reaction sequence involves reacting a phosphorus trihalide with a phenol or mixture of different phenols, including substituted phenols, in the presence of an alcohol or water. The resulting phosphonate is removed from the reaction mass by any known separating means. Other reaction processes may, of course, be used to prepare the organic phosphonate for the purpose of this invention.

Suitable phosphonates include diphenyl phosphonate, ditolyl phosphonate, dinonylphenyl phosphonate, diamylphenyl phosphonate, di-(diamylphenyl)phosphonate, dioctylphenyl phosphonate, chlorophenyl phosphonate, and the like.

Most of the organic amines suitable in this invention are available, or may be prepared by known chemical procedures. Suitable amines for this invention include methyl amine, n-butyl amine, t-butyl amine, amyl amine, hexyl amine, octyl amine, decyl amine, dodecyl amine, octadecyl amine, eicosyl amine, docosyl amine, tricosyl amine, tricontyl amine, and secondary amines containing these organic groups including mixed groups. Mixtures of different amines may also be employed. Commercial mixtures include, for example, a mixture of $C_{18}$ to $C_{20}$ tertiary-alkyl primary amines, a mixture of $C_{15}$ to $C_{20}$ primary amines, a mixture of $C_8$ to $C_{18}$ primary amines, and a mixture of n-alkyl substituted alkylene diamines, such as propylene diamines. Aromatic amines may also be employed, such as phenyl amine, diphenyl amine, phenylnaphthyl amine, and the like. The organic groups may contain atoms of oxygen, sulfur, nitrogen and halogen, in the form of alkoxy, or aryloxy groups, alkylthio or arylthio groups, the alkyl and aryl portions thereof containing from 1 to about 30 carbon atoms, and nitro or cyano groups, attached to the organic groups. The preferred amines are primary alkyl amines.

The most preferred combination of phosphonate and amine is the diaryl phosphonate and the long-chain primary amines (8 or more carbon atoms), especially dinonylphenyl phosphonates and the $C_{18}$–$C_{22}$ tertiary-alkyl primary amine mixture.

The novel additive combination of this invention may be prepared by first heating the phosphonate and the amine together at an elevated temperature. The temperature may range from 50° to about 300° F. and preferably from about 100° to about 250° F. The mixture is stirred for a period of time ranging from about 5 minutes to about 1 hour. A nitrogen blanket may be employed during this procedure. The mixture of the two components may form the same product described above by combining them separately in the ester medium itself and thereafter subjecting the total composition to storage or to actual use at high temperatures. Use of either means of combining the two components results in liquid products of extraordinary load-carrying capability and stability.

The two components may be combined at any molar ratio. Improved results in the desirable properties, however, call for a molar ratio in the range of 2:1 to 1:2 of phosphonate to amine. The preferred range is from 2:1 to 1:1.

Synthetic ester lubricating fluids are employed in this invention. The synthetic ester fluids of particular interest to this invention are those prepared from monocarboxylic acids having from 1 to about 20 carbon atoms and (1) 2,2-dialkyl propanediols, particularly asymmetrically substituted dialkyl propanediols, such as 2,2-dimethyl, 2,2-diethyl, 2-methyl-2-ethyl, 2-methyl-2-propyl, 2,2-dipropyl and 2-ethyl-2-propyl propane 1,3-diols, (2) trimethylpropane, or (3) pentaerythritol. The lubricant medium may comprise only one ester or it may be a mixture of esters prepared from the stated materials. Furthermore, the acids used in forming the esters may be a single acid or a mixture of acids. A pentaerythritol tetraester of acids containing from about 4 to about 12 carbon atoms provides a most desirable fluid.

Respecting the present invention, it was surprisingly found that combinations of aliphatic or aromatic phosphonates with amines were ineffective antioxidants for diester lubricants of the types disclosed by the references discussed above. In a catalytic oxidation test, in which oxygen is bubbled through the composition at a rate of 5 hours at 425° F. for 48 hours, representative combination of phosphonates and amines failed due to excessive sludge formation. The following will demonstrate this ineffectiveness.

| Phosphonate | Weight, percent | Amine | Weight, percent | Sludge Liquid | Sludge Interface | Percent increase-viscosity at 100° F. |
|---|---|---|---|---|---|---|
| Diphenyl | 0.5 | PAN[1] | 0.1 | Heavy | Medium | 68 |
| Diisopropyl | 0.3 | PAN | 0.2 | ...do | ...do | 93 |
| Ditolyl | 0.3 | $C_{18}$–$C_{22}$ | 0.2 | ...do | ...do | 156 |
| Diamylphenyl | 0.3 | $C_{18}$–$C_{22}$ | 0.2 | ...do | ...do | 218 |
| Dinonylphenyl | 0.3 | $C_{18}$–$C_{22}$ | 0.2 | ...do | ...do | 101 |

[1] Phenyl-α-naphthylamine.
[2] The amine of Example 1 hereof.

The base medium used, di(2-ethylhexyl) azelate, showed the same sludge formation (i.e., heavy-liquid, medium-interface) and a viscosity increase of 152%. Thus, although there was an apparent reduction in viscosity increase, all combinations failed because of their inability to reduce the sludge evident in the uninhibited diester.

It was also discovered that mixtures of alkyl phosphonates of the type disclosed in British Pat. 899,101 and U.S. Pat. No. 3,321,401, and amines do not effectively improve the load carrying properties of the ester lubricants of this invention. For example, a mixture of 0.15 wt. percent of dibutyl phosphonate and 0.1% diamylamine gave a scuff load (according to the test described herein) of 3035 pounds (average) in a tetra-ester of pentaerythritol prepared from pentaerythritol and a mixture of valeric and pelargonic ($C_5$ and $C_9$) acids. This scuff load is not significantly greater than that obtained with the uninhibited ester fluid.

It will be noted that the above tests include phosphonates and amines common to the present application and the cited art. Since in each case the tested member failed, either as an antioxidant or as a load-carrying agent, it is indeed surprising that the instantly claimed phosphonate and amine combinations were effective in the esters of the claims.

The following examples illustrate the various aspects of this invention. Percentages reported in the examples are on a weight basis.

EXAMPLE 1

Preparation of amine-phosphonate

Into a suitable reactor equipped with a stirrer, a thermometer, a heating means, and nitrogen-gas inlet tube was added 15 grams (0.031 mole) of dinonylphenyl phosphonate. To the phosphonate was added 10 grams (about 0.034 mole average) of a mixture of $C_{18}$ to $C_{22}$ tertiary-alkyl primary amines. The mixture was stirred with heating to 200° F. for about 10 minutes. A nitrogen gas atmosphere was provided during the heating.

The final product was a clear liquid. The molecular weight determination and infrared analyses indicated a partial reaction occurred.

Lead corrosion test

In this test, a liquid lubricating oil composition is stored in an oven at 230° F. for an extended period of time. After storage at 230° F., the sample is tested for lead corrosion according to Federal Test Method 5321, after intervals of 1 to 7 days of storage. Aviation lubricants, particularly lubricants in jet engines, must have minimal corrosion. Military Specifications MIL-L-007808F and MIL-L-23699A, in fact, limit corrosion to a maximum of 150 mg./sq. in. of specimen after 7 days storage at 230° F.

The product obtained in Example 1 was blended into a fluid composition at various weight concentrations. The base fluid was a tetra-ester of pentaerythritol and a mixture of $C_5$- and $C_9$-carboxylic acids. Also present were other additives such as oxidation-inhibitors, corrosion inhibitors, and the like, in minor proportions. The following results were obtained:

TABLE 1

| Concentration of additive, percent weight | Lead corrosion after storage at 230° F. for days, mg./in.$^2$ | | | |
|---|---|---|---|---|
| | 0 | 1 | 4 | 7 |
| 0.25 | | | 4.6 | 6.6 |
| 0.50 | | 0.26 | 2.4 | 58.4 |
| 1.00 | | | | 0.1 |
| 0.50 of dinonylphenyl phosphonate alone | | 215.3 | | |

The dinonylphenyl phosphonate alone, without the mixed amines permitted corrosion of 215.3 mg./sq. in. without any storage at 230° F. The additive of this invention, at the same concentration, permitted only 0.26 mg./sq. in. after the same length of time.

The product of Example 1, at 0.25% by weight was tested in a mixed ester lubricant. The pentaerythritol ester used was the same as used previously, and was prepared from pentaerythritol (containing about 88% monomer and 12% of the dimer) and about 4 moles per mole of said pentaerythritol of a mixture of commercial iso-pentanoic acid (containing both normal and iso-valeric acids) and pelargonic acid. The second ester was prepared from 2-methyl-2-ethyl propane-1,3-diol and 2 moles of pelargonic acid per mole of diol. The pentaerythritol and diol esters were mixed in the ratio of 30 to 70, respectively. After 7 days storage at 230° F., lead corrosion was 3.4 mg./sq. in.

The lead corrosion test was performed on oil compositions containing other phosphonates and phosphonate: amine products which were prepared under the conditions similar to those of Example 1 using the same above formulation. The results are tabulated in the table below:

TABLE 2

| Product tested | Concentration of phosphonate, weight percent | Lead corrosion after storage at 230° F. for days, mg./in.$^2$ | |
|---|---|---|---|
| | | 4 days | 7 days |
| Example: | | | |
| Diphenyl phosphonate | 0.18 | 40.0 | 227 |
| 2 Diphenyl phosphonate:amine of Ex. 1 (1:1 mole ratio). | 0.18 | 0.8 | 2.5 |
| Dinonylphenyl phosphonate | 0.37 | 156.0 | 259 |
| 3 Dinonylphenyl phosphohate: mixed $C_{15}$–$C_{20}$ primary amines (1:1 mole ratio). | 0.17 | | 39.5 |

The dinonylphenyl phosphonate and several amines were combined as separate additives in the pentaerythritol ester lubricant described above, containing a mixture of aromatic amines. The results are tabulated as follows:

TABLE 3

| Additives | Concentration, weight percent | Lead loss, mg./in.$^2$ after days storage at 230° F. | | | |
|---|---|---|---|---|---|
| | | 0 | 2 | 5 | 7 |
| Example: | | | | | |
| 4 {Dinonylphenyl phosphonate | 0.14 | | | | |
| {Amine of Example 1 | 0.11 | | *5.0 | 6.9 | 8.6 |
| 5 {Dinonylphenyl phosphonate | 0.28 | | | | |
| {Amine of Example 1 | 0.22 | | 7.8 | | 55.1 |
| 6 {Dinonylphenyl phosphonate | 0.1 | | | | |
| {Triamylamine | 0.1 | | 7.2 | 15.4 | 24.5 |
| 7 {Dinonylphenyl phosphonate | 0.1 | | | | |
| {Tricapryl amine | 0.24 | | | 2.4 | 20.9 |
| 8 {Dinonylphenyl phosphonate | 0.1 | | | | |
| {Tricapryl amine | 0.5 | | | 1.0 | 7.4 |

*After 3 days.

Ryder gear test

This test evaluates the load-carrying ability of engine lubricants, particularly those used for aircraft turbine engines. The test machine is a standard unit in which two parallel shafts are connected to two helical gears and two test spur gears in the form of a square. A stepwise increasing load is exerted on the test gears by causing azial movement of one shaft relative to the other. The teeth of one test gear are examined for scuffing after each load increment without removing the gears from the gear casing. When the inspection shows 22½% of the area of the teeth scuffed, the load is reported. The result represents the scuff load as an average of two sides of the teeth. The test oil is used as the lubricant for the gears. The higher the scuff load, the more effective is the lubricant in load-carrying operations.

A number of lubricant compositions using pentaerythritol ester as the base fluid, containing dinonylphosphonate alone or amino-phosphonate additive, were tested in this method. The concentration of the additives in each case is 0.5% by weight. The results are tabulated as follows:

| Additive | Storage period before test, days* | Scuff load, pounds |
|---|---|---|
| None | | 2,700 |
| Dinonylphenyl phosphonate | {0 | 3,505 |
| | {7 | 2,987 |
| Product of Example 6 | {0 | 4,417 |
| | {7 | 4,125 |

*At 230° F.

These results show that the storage stability of the amine-phosphonate blends is excellent compared to the phosphonate.

The pentaerythritol ester composition containing the amine-phosphonate product of Example 1, was compared with the phosphonate alone, at several weight concentrations. The total additive concentration is reported, along with the Ryder gear test results:

| Concentration, percent by weight: | Dinonyl-phenyl phospho-nate | Product of Example 1 |
|---|---|---|
| 0.37 | 3,115 | *3,214 |
| 0.75 | 3,195 | 3,758 |
| 1.48 | 2,904 | 4,179 |

*At 0.25%.

The product of Example 1 provides increased load-carrying properties with increased concentrations. On the other hand, the phosphonate alone in the ester fluid cannot be improved no matter how much additional phosphonate is added.

The presence of the tertiary-$C_{18}$–$C_{22}$ primary amine employed in Example 1 provides no load-carrying properties to the fluid. The fluid composition containing 0.22% of the amine is 2811 pounds.

Results of the above tests show evidence of a new and unexpected mixture for ester fluids. The fluid compositions possess a high degree of storage stability. The combinations of this invention provide higher load-carrying properties than hitherto observed. They permit little or no lead corrosion after a passage of several days. They may be used alone in the ester fluid or in the presence of other additives, such as detergents, load-carrying additives, and the like.

The above disclosure has presented this invention in specific terms, but such terms are not to be taken as limitations of the invention; except in accordance with the accompanying claims.

We claim:
1. An synthetic fluid lubricant composition comprising a major proportion of a synthetic ester lubricating oil prepared from a monocarboxylic acid containing from 1 to 20 carbon atoms and a member of a group consisting of trimethylolpropane, pentaerythritol and 2,2-dialkyl propane diol, wherein said alkyl contains from 1 to 3 carbon atoms, and an amount sufficient to improve the load-carrying and storage stability of said composition of a member of the group consisting of a preheated mixture and a mixture combined separately in the presence of said lubricating oil of an organic phosphonate and an amine, wherein the phosphonate has the formula:

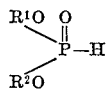

wherein $R^1$ and $R^2$ are individually selected from the group consisting of aryl and alkyl-substituted aryl, and wherein each of $R^1$ and $R^2$ have from 6 to about 40 carbon atoms, and wherein the amine has the formula:

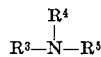

wherein $R^3$, $R^4$, and $R^5$ are individually selected from the group consisting of hydrogen, alkyl, cycloalkyl, aryl, and alkyl-substituted aryl, wherein each of the organo groups has from 1 to about 30 carbon atoms and wherein no more than two of said R's are hydrogen.

2. The composition of claim 1, wherein the said $R^3$, $R^4$, and $R^5$ are substituted with a member of the group consisting of alkoxy, aryloxy, alkylthio, arylthio, nitro, cyano, and halogen, the alkyl and aryl portions thereof containing from 1 to about 30 carbon atoms.

3. The composition of claim 1, wherein $R^1$ and $R^2$ have from 6 to about 25 carbon atoms.

4. The composition of claim 1, wherein $R^1$ and $R^2$ are both phenyl.

5. The composition of claim 1, wherein $R^1$ and $R^2$ are both nonylphenyl.

6. The composition of claim 1, wherein at least one of $R^3$, $R^4$, and $R^5$ is an alkyl group.

7. The composition of claim 1, wherein the amine is an alkyl primary amine having at least 8 carbon atoms.

8. The composition of claim 5, wherein the amine is a tertiary $C_{18}$–$C_{22}$ alkyl primary amine mixture.

9. The composition of claim 1, wherein the amine is a tricapryl amine.

10. The composition of claim 1, wherein the 2,2-dialkyl propane diol is 2-methyl-2-ethyl propane-1,3-diol.

11. The composition of claim 1, wherein the ester lubricant is a mixture of a pentaerythritol ester and a 2,2-dialkyl propane diol.

12. The composition of claim 11, wherein the diol is 2-methyl-2-ethyl propane-1,3-diol.

13. The composition of claim 8, wherein the ester is a pentaerythritol ester prepared from a mixture of valeric and pelargonic acids.

14. The composition of claim 1, wherein the amine is selected from the group consisting of phenylamine, diphenylamine, phenylnaphthylamine and dioctyldiphenylamine.

15. The composition of claim 6, wherein the amine is a $C_{15}$–$C_{20}$-alkyl primary amine.

References Cited

UNITED STATES PATENTS

| 2,285,855 | 6/1942 | Downing et al. | 252—49.9X |
| 2,614,990 | 10/1952 | Harmon et al. | 252—49.9X |
| 2,824,113 | 2/1958 | Zech | 260—987X |
| 3,115,465 | 12/1963 | Orloff et al. | 252—49.9 |
| 3,115,466 | 12/1963 | Orloff et al. | 252—49.9 |
| 3,166,505 | 1/1965 | Kirby | 252—49.9X |
| 3,321,401 | 5/1967 | Ford et al. | 252—49.9X |

FOREIGN PATENTS

| 899,101 | 6/1962 | Great Britain | 252—49.9 |

DANIEL E. WYMAN, Primary Examiner

W. H. CANNON, Assistant Examiner

U.S. Cl. X.R.

252—49.9